(12) United States Patent
Yamada

(10) Patent No.: US 9,174,669 B2
(45) Date of Patent: Nov. 3, 2015

(54) CONTROL APPARATUS FOR HYDRAULIC POWER STEERING SYSTEM

(71) Applicant: JTEKT CORPORATION, Osaka-shi, Osaka (JP)

(72) Inventor: Yasushi Yamada, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/193,730

(22) Filed: Feb. 28, 2014

(65) Prior Publication Data

US 2014/0257638 A1 Sep. 11, 2014

(30) Foreign Application Priority Data

Mar. 7, 2013 (JP) .................................. 2013-045463

(51) Int. Cl.
*B62D 5/065* (2006.01)
*B62D 5/06* (2006.01)

(52) U.S. Cl.
CPC ................ *B62D 5/065* (2013.01); *B62D 5/064* (2013.01)

(58) Field of Classification Search
None
See application file for complete search history.

(56) References Cited

U.S. PATENT DOCUMENTS

| 3,730,288 | A | * | 5/1973 | Dean | 180/406 |
| 3,826,328 | A | * | 7/1974 | Sheppard | 180/406 |
| 4,400,938 | A | * | 8/1983 | Ohe | 60/429 |
| 5,862,878 | A | * | 1/1999 | Bohner et al. | 180/403 |
| 2002/0063031 | A1 | * | 5/2002 | Fischer et al. | 192/83 |
| 2005/0210895 | A1 | * | 9/2005 | Horton | 62/158 |
| 2006/0175119 | A1 | * | 8/2006 | Broughton | 180/422 |
| 2008/0277186 | A1 | * | 11/2008 | Williams | 180/403 |
| 2008/0301478 | A1 | * | 12/2008 | Scott et al. | 713/320 |
| 2009/0082927 | A1 | * | 3/2009 | Lazanja et al. | 701/48 |
| 2011/0313621 | A1 | * | 12/2011 | Williams | 701/41 |
| 2013/0015013 | A1 | * | 1/2013 | Sunaga et al. | 180/421 |
| 2014/0257638 | A1 | * | 9/2014 | Yamada | 701/41 |

FOREIGN PATENT DOCUMENTS

| JP | 09095251 A | * | 4/1997 | ............... B62D 5/07 |
| JP | A-9-95251 | | 4/1997 | |
| JP | A-2008-238882 | | 10/2008 | |

OTHER PUBLICATIONS

English Translation of JP09095251A, Accessed Mar. 6, 2015.*

* cited by examiner

*Primary Examiner* — Yonel Beaulieu
*Assistant Examiner* — Krishnan Ramesh
(74) *Attorney, Agent, or Firm* — Oliff PLC

(57) ABSTRACT

In a control apparatus for a hydraulic power steering system including multiple electric pumps, a first ECU determines that start-up of a first motor is completed when a first current value, which is a value of current flowing to a first electric pump, has been within a prescribed current range continuously for a prescribed period of time or longer. An upper limit of the prescribed current range is set to be less than to a limit value provided as an upper limit of a current supplied simultaneously to the first and second electric pumps after completion of start-up. A lower limit of the prescribed current range is set to a minimum value of a current indicating that the first electric pump is in an energized state. After start-up of the first motor is determined to be completed, a second ECU starts electric power supply to the second electric pump.

2 Claims, 7 Drawing Sheets

CONTROL APPARATUS FOR HYDRAULIC POWER STEERING SYSTEM

INCORPORATION BY REFERENCE

The disclosure of Japanese Patent Application No. 2013-045463 filed on Mar. 7, 2013 including the specification, drawings and abstract, is incorporated herein by reference in its entirety.

BACKGROUND OF THE INVENTION

1. Field of the Invention

The invention relates to a control apparatus for a hydraulic power steering system.

2. Description of the Related Art

Conventionally, a hydraulic power steering system that applies assist force to a steering system with the use of a hydraulic actuator such as a hydraulic cylinder has been widely known. For example, Japanese Patent Application Publication No. 2008-238882 (JP 2008-238882 A) describes a hydraulic power steering system in which an electric pump that is driven by a motor to generate hydraulic pressure is used as a hydraulic power source for a hydraulic actuator. In such a hydraulic power steering system, even when a steering operation is not performed, the electric pump usually keeps driving at a relatively low rotational speed (standby rotational speed). This makes it possible to apply assist force promptly, thereby improving the responsiveness.

When the electric pump is started from a standstill (a supply of electric power for driving the electric pump is started), for example, when an ignition switch (IG) is turned on, a large current instantaneously flows to the motor because inductive voltage has not been generated in the motor. Especially when the ambient temperature is low, the current that flows to the motor at the time of starting the electric pump is likely to be large because the viscosity of hydraulic fluid becomes high and therefore the load on the motor becomes high. Therefore, an in-vehicle power supply mounted in a vehicle is required to have a capacity high enough not to affect the operation of electric equipment even if a large amount of current is consumed by the electric pump at the time of, for example, turning on the ignition switch.

In recent years, for the purpose of further improving the responsiveness, providing a plurality of electric pumps in a hydraulic power steering system has been proposed. However, in this case, a significantly large amount of current is consumed at the time of, for example, turning on an ignition switch. Therefore, it is necessary to increase the capacity of an in-vehicle power supply depending on the number of electric pumps. As a result, for example, the cost of manufacturing the hydraulic power steering system may significantly increase.

SUMMARY OF THE INVENTION

One object of the invention is to provide a control apparatus for a hydraulic power steering system including a plurality of electric pumps, the control apparatus being configured to prevent excessive current consumption.

A control apparatus for a hydraulic power steering system according to an aspect of the invention is used for a hydraulic power steering system including two or more electric pumps that supply hydraulic fluid to a hydraulic actuator that generates assist force. When starting the two or more electric pumps, the control apparatus for the hydraulic power steering system staggers timings to start electric power supplies to motors serving as driving sources of the respective electric pumps.

With the configuration described above, it is possible to prevent a large current from flowing simultaneously to the two or more electric pumps because the timings to start the electric pumps are staggered. Thus, even if a plurality of electric pumps is provided, it is possible to prevent the amount of current that is consumed, for example, at the time of turning on an ignition switch (IG) from being excessive.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
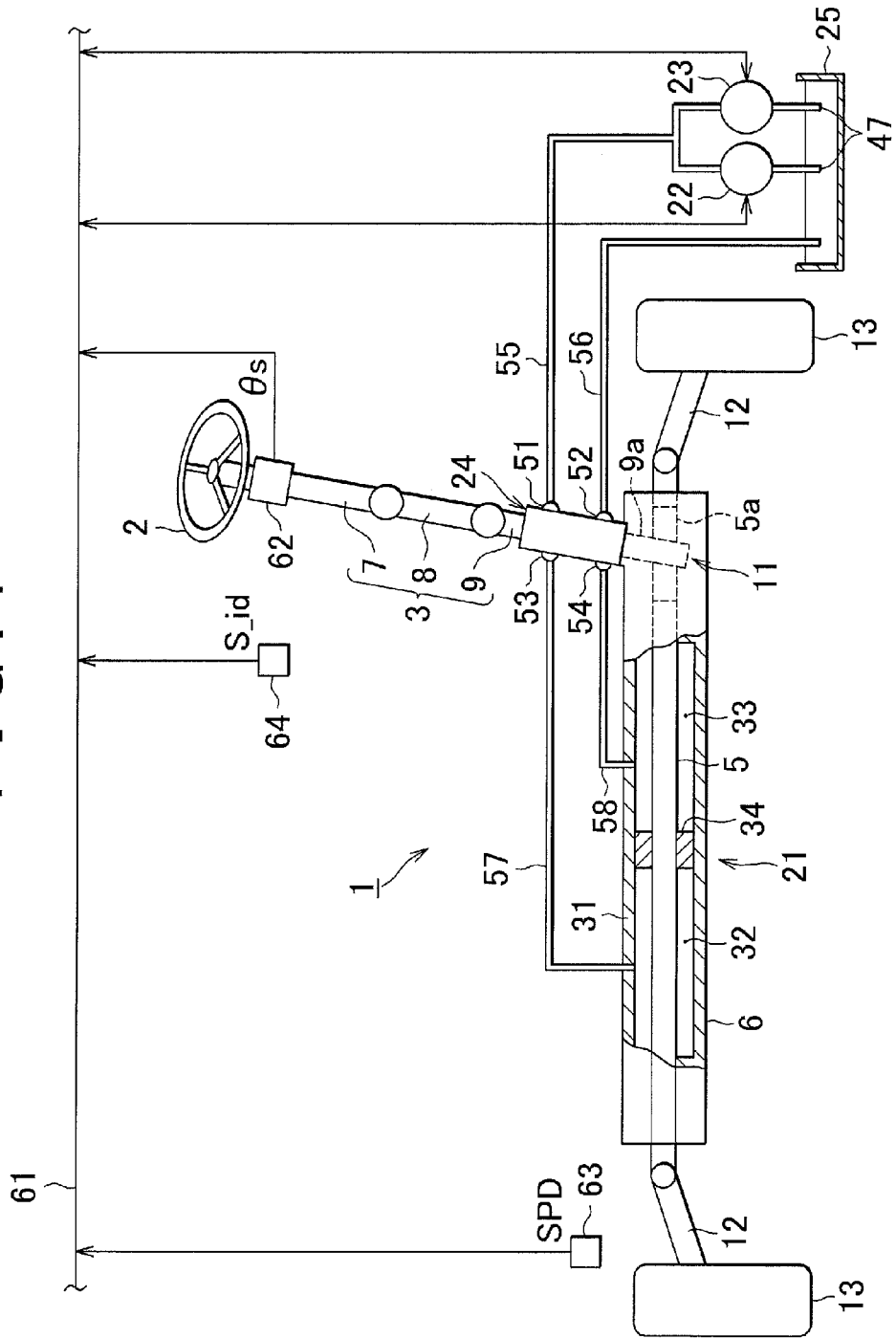
FIG. 1 is a view schematically illustrating the configuration of a hydraulic power steering system.

Hereinafter, a control apparatus for the hydraulic power steering system 1 according to a first embodiment of the invention will be described with reference to the accompanying drawings. The hydraulic power steering system 1 illustrated in FIG. 1 is mounted in a vehicle having a so-called stop-and-start system that automatically stops an engine when the vehicle is brought to a temporary stop. As illustrated in FIG. 1, the hydraulic power steering system 1 includes: a steering shaft 3 to which a steering wheel 2 is fixed; a rack shaft 5 that makes a reciprocating motion in its axial direction in response to the rotation of the steering shaft 3; and a generally cylindrical rack housing 6 through which the rack shaft 5 extends so as to be able to make a reciprocating motion. The steering shaft 3 is formed by connecting a column shaft 7, an intermediate shaft 8, and a pinion shaft 9, which are arranged in order from the steering wheel 2 side, to each other.

The rack shaft 5 and the pinion shaft 9 are disposed in the rack housing 6 with a prescribed crossing angle formed therebetween. Rack teeth 5a formed on the rack shaft 5 and pinion teeth 9a formed on the pinion shaft 9 are meshed with each other, whereby a rack-and-pinion mechanism 11 is constituted. Tie rods 12 are connected to respective ends of the rack shaft 5, and the distal ends of the tie rods 12 are connected to knuckles (not illustrated) to which steered wheels 13 are fitted. In the hydraulic power steering system 1, the rotation of the steering shaft 3 in response to a steering operation is converted into an axial movement of the rack shaft 5 by the rack-and-pinion mechanism 11, and then the axial movement is transmitted to the knuckles via the tie rod 12. As a result, the steering angle of the steered wheel 13, that is, the traveling direction of the vehicle is changed.

The hydraulic power steering system 1 includes a hydraulic cylinder 21, which may function as a hydraulic actuator that generates assist force for assisting a steering operation; and a first electric pump 22 and a second electric pump 23 that supply hydraulic fluid to the hydraulic cylinder 21. The hydraulic power steering system 1 includes: a selector valve 24 that controls the supply of the hydraulic fluid to the hydraulic cylinder 21 and the discharge of the hydraulic fluid from the hydraulic cylinder 21; and a storage tank 25 that stores the hydraulic fluid that is to be supplied to the hydraulic cylinder 21 by the first and second electric pumps 22, 23 and the hydraulic fluid discharged from the hydraulic cylinder 21.

The hydraulic cylinder 21 includes a cylindrical cylinder tube 31 that is formed of a portion of the rack housing 6. The rack shaft 5 extends through the cylinder tube 31 so as to be able to make a reciprocating motion. The hydraulic cylinder 21 is provided with a piston 34 that partitions the inner space of the cylinder tube 31 into a first hydraulic chamber 32 and a second hydraulic chamber 33. The piston 34 is fixed to the rack shaft 5 so as to be movable together with the rack shaft 5 in the axial direction.

Figure 2:
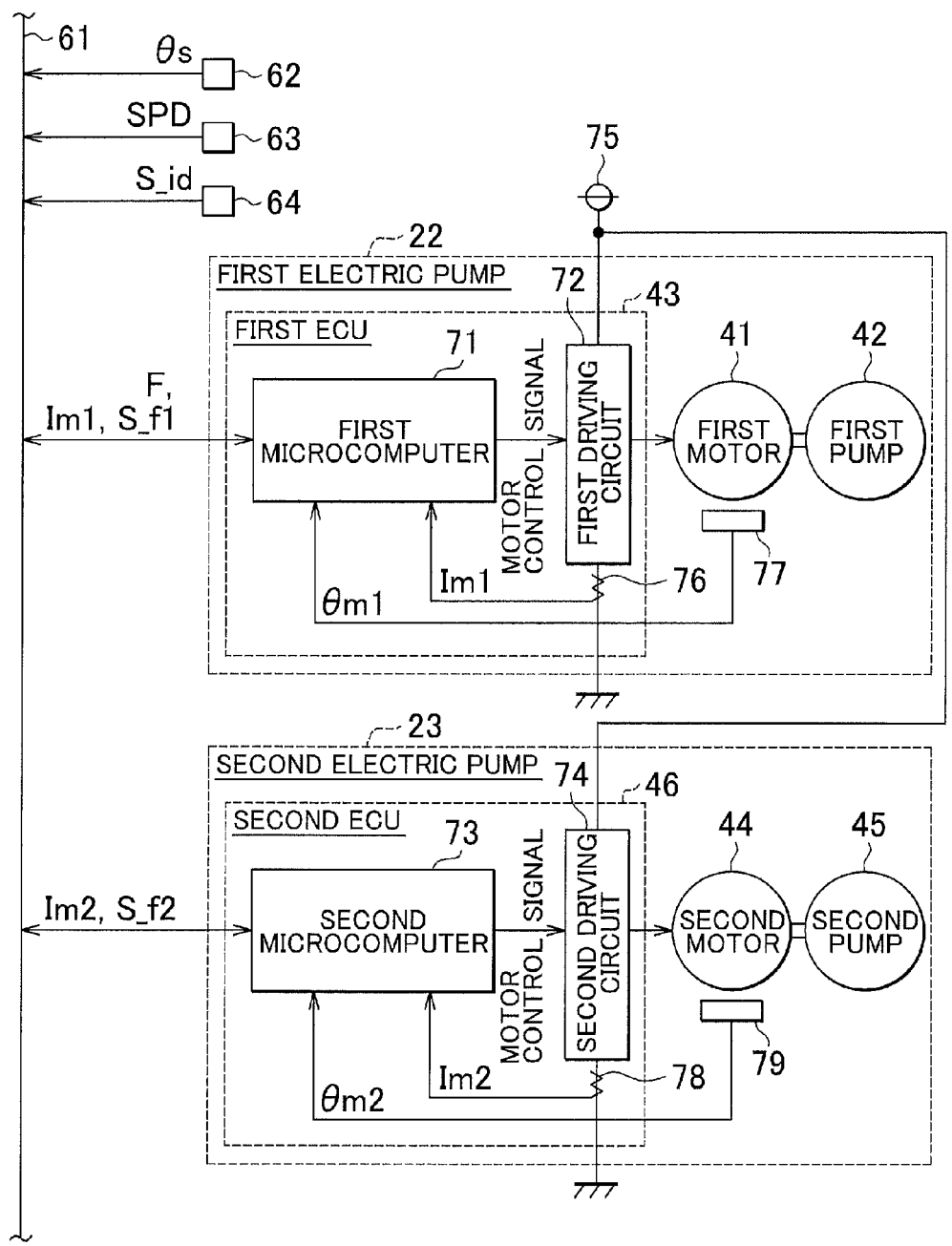
FIG. 2 is a block diagram of the hydraulic power steering system.

As illustrated in FIG. 2, the first electric pump 22 includes a first motor 41, which serves as a driving source, a first pump 42 that generates hydraulic pressure by being driven by the first motor 41, and a first ECU 43 that controls the operation of the first motor 41. The second electric pump 23 includes a second motor 44, which serves as a driving source, a second pump 45 that generates hydraulic pressure from being driven by the second motor 44, and a second ECU 46 that controls the operation of the second motor 44. That is, in the present embodiment, the control apparatus is formed of the first ECU 43 and the second ECU 46. As illustrated in FIG. 1, an intake port (not illustrated) of each of the first electric pump 22 and the second electric pump 23 is connected to the storage tank 25 through an intake oil passage 47.

The selector valve 24 is a known rotary valve that controls the supply of the hydraulic fluid to the first hydraulic chamber 32 and the second hydraulic chamber 33 of the hydraulic cylinder 21 and the discharge of the hydraulic fluid from the first hydraulic chamber 32 and the second hydraulic chamber 33 of the hydraulic cylinder 21, in response to a steering operation. Specifically, the selector valve 24 has a supply port 51, a discharge port 52, a first supply-discharge port 53, and a second supply-discharge port 54. The supply port 51 is connected to a discharge port (not illustrated) of each of the first electric pump 22 and the second electric pump 23 through an oil supply passage 55 bifurcated at its one end side. The discharge port 52 is connected to the storage tank 25 through an oil discharge passage 56. The first supply-discharge port 53 is connected to the first hydraulic chamber 32 through a first oil supply-discharge passage 57, and the second supply-discharge port 54 is connected to the second hydraulic chamber 33 through a second oil supply-discharge passage 58.

In the hydraulic power steering system 1 configured as described above, the hydraulic fluid drawn up from the storage tank 25 by the first electric pump 22 and the second electric pump 23 is supplied to the selector valve 24 through the oil supply passage 55. Then, the hydraulic fluid supplied to the selector valve 24 is supplied to one of the first hydraulic chamber 32 and the second hydraulic chamber 33 through a corresponding one of the first oil supply-discharge passage 57 and the second oil supply-discharge passage 58 depending on a driver's steering operation. At this time, the hydraulic fluid is discharged from the other one of the first hydraulic chamber 32 and the second hydraulic chamber 33, and the hydraulic fluid is discharged to the storage tank 25 through a corresponding one of the first oil supply-discharge passage 57 and the second oil supply-discharge passage 58, the selector valve 24, and the oil discharge passage 56. As a result, a difference in hydraulic pressure occurs between the first hydraulic chamber 32 and the second hydraulic chamber 33 and the rack shaft 5 moves in the axial direction together with the piston 34 on the basis of the difference in hydraulic pressure, whereby the steering operation is assisted.

Next, the electrical configuration of the hydraulic power steering system will be described. As illustrated in FIG. 1 and FIG. 2, the first electric pump 22 and the second electric pump 23 are connected to each other through a controller area network (CAN) 61. A steering sensor 62 and a vehicle speed sensor 63 are connected to the CAN 61, and a steering angle $\theta s$ of the steering wheel 2 and a vehicle speed SPD are transmitted to the CAN 61. A master ECU 64 is connected to the CAN 61, and a stop-start signal S_id indicating whether or not the vehicle is in a no-idling stop state (in which the stop-start system is started) is transmitted to the CAN 61. Then, the first ECU 43 and the second ECU 46 control the operations of the first electric pump 22 (the first motor 41) and the second electric pump 23 (the second motor 44) in cooperation with each other on the basis of the state quantities obtained through the CAN 61.

Specifically, as illustrated in FIG. 2, the first ECU 43 includes a first microcomputer 71 that outputs a motor control signal, and a first driving circuit 72 that supplies driving electric power to the first motor 41 on the basis of the motor control signal. The second ECU 46 includes a second microcomputer 73 that outputs a motor control signal, and a second driving circuit 74 which supplies driving electric power to the second motor 44 on the basis of the motor control signal. The first driving circuit 72 and the second driving circuit 74 are connected to a single in-vehicle power supply (battery) 75 mounted in the vehicle.

As each of the first driving circuit 72 and the second driving circuit 74, a known PWM inverter is adopted. In each PWM inverter, a pair of switching elements (for example, FETs) connected in series is regarded as a basic unit (a switching arm). Each PWM inverter is formed by connecting multiples pairs of the switching elements in parallel. A motor control signal is used to define the on-off state (on-duty ratio) of each switching element. Then, the first driving circuit 72 and the second driving circuit 74 supply the driving electric power based on on-duty ratios indicated by the received motor control signals and the voltage of the in-vehicle power supply 75, to the first motor 41 and the second motor 44, respectively.

A first current sensor 76 that detects a first current value Im1 indicating a value of current that is passed to the first motor 41 (the first electric pump 22), and a first rotation angle sensor 77 which detects a first rotation angle $\theta m1$ indicating the rotation angle of the first motor 41 are connected to the first microcomputer 71. A second current sensor 78 that detects a second current value Im2 indicating a value of current that is passed to the second motor 44 (the second electric pump 23), and a second rotation angle sensor 79 that detects a second rotation angle $\theta m2$ indicating the rotation angle of the second motor 44 are connected to the second microcomputer 73. Each of the first microcomputer 71 and the second microcomputer 73 receives a state quantity from each sensor with a prescribed sampling period, and receives each state quantity from the CAN 61. The first current value Im1 and the second current value Im2 are respectively transmitted from the first microcomputer 71 and second microcomputer 73 to the CAN 61. Then, the first microcomputer 71 and the second microcomputer 73 output the motor control signals on the basis of the acquired state quantities to control the operations of the first motor 41 and the second motor 44 through the supply of driving electric power.

Specifically, the first microcomputer 71 executes rotational speed control (speed feedback control) such that a first rotational speed ω1 indicating the rotational speed of the first motor 41 coincides with a target rotational speed that is computed on the basis of the steering angle θs and the vehicle speed SPD, thereby outputting a motor control signal to control the operation of the first motor 41. The first rotational speed ω1 is obtained by differentiating the first rotation angle θm1. As the minimum value of the target rotational speed, a standby rotational speed, which is a relatively low rotational speed, is set in advance. Then, a target rotational speed that is higher than the standby rotational speed is computed on the basis of a steering velocity ωs, which is obtained by differentiating the steering angle θs, and the vehicle speed SPD. The larger the absolute value of the steering velocity ωs is, or the lower the vehicle speed SPD is, the higher the target rotational speed computed by the first microcomputer 71 is.

In a case where the second electric pump 23 is at a standstill (a case where the driving electric power is not supplied), the first microcomputer 71 controls the operation of the first motor 41 such that the first rotational speed ω1 follows the target rotational speed in a state where no limitation is imposed on the first current value Im1 (normal rotational speed control). On the other hand, in a case where the second electric pump 23 is operating (a case where the driving electric power is supplied), the first microcomputer 71 controls the operation of the first motor 41 such that the first rotational speed ω1 follows the target rotational speed in a state where the first current value Im1 is limited to a value less than or equal to a prescribed limit value I_lim (rotational speed control with current limitation). In the present embodiment, the limit value I_lim is set to the maximum value (for example, approximately 75 A) of current that can be stably supplied simultaneously from the in-vehicle power supply 75 to the first electric pump 22 and the second electric pump 23 after completion of start-up. Even if a deviation between the target rotational speed and the first rotational speed ω1 is large, when the first current value Im1 comes close to the limit value I_lim, the non-duty ratio indicated by the motor control signal is limited to a small value, so that the first current value Im1 does not exceed the limit value I_lim.

When the first microcomputer 71 is not able to receive the state quantities due to an abnormality of the CAN 61, the first microcomputer 71 controls the operation of the first motor 41 such that the rotational speed of the first motor 41 coincides with an alternative target rotational speed set in advance in a state where the first current value Im1, which is a value of current that is passed to the first motor 41, is limited to a value less than or equal to the limit value I_lim (alternative rotational speed control).

The first microcomputer 71 executes an abnormality determination on the first motor 41 on the basis of the first current value Im1 and the first rotation angle θm1. Then, the first microcomputer 71 transmits a first abnormality determination signal S_f1 indicating the result of the abnormality determination to the CAN 61 and stops the first motor 41 by stopping the supply of the driving electric power if an abnormality is detected. As a method of determining whether there is an abnormality, various methods may be adopted. Examples of the various methods include a method in which it is determined that there is an abnormality if the first current value Im1 becomes an unlikely value, and a method in which it is determined that there is an abnormality if the first rotation angle θm1 does not change although the driving electric power is supplied. The first microcomputer 71 stops the first motor 41 by stopping the supply of the driving electric power also in a case where the first microcomputer 71 receives the stop-start signal S_id indicating that the vehicle is in the no-idling stop state, from the CAN 61.

Like the first microcomputer 71, the second microcomputer 73 executes normal rotational speed control in a case where the first electric pump 22 is at a standstill, executes rotational speed control with current limitation in a case where the first electric pump 22 is operating, and executes alternative rotational speed control in a case where the second microcomputer 73 is not able to receive the state quantities due to an abnormality of the CAN 61.

Like the first microcomputer 71, the second microcomputer 73 executes an abnormality determination on the second motor 44 on the basis of the second current value Im2 and the second rotation angle θm2, transmits a second abnormality determination signal S_f2 indicating the result of the abnormality determination to the CAN 61, and stops the second motor 44 by stopping the supply of the driving electric power. The second microcomputer 73 stops the second motor 44 by stopping the supply of the driving electric power also in a case where the second microcomputer 73 receives the stop-start signal S_id indicating the vehicle is in the no-idling stop state, from the CAN 61. The second microcomputer 73 stops the second motor 44 by stopping the supply of the driving electric power in a case where the first current value Im1 is greater than an allowable current value I_th (for example, approximately 100 A) that is greater than the limit value I_lim described above. (確認ここまで)

When the first electric pump 22 and the second electric pump 23 are started from a standstill (when the supply of the driving electric power is started), for example, when the ignition switch (IG) is turned on or when the vehicle restarts after no-idling stop, a large current instantaneously flows to each of the first motor 41 and the second motor 44 because inductive voltage has not been generated in the first motor 41 and the second motor 44. Therefore, if the first electric pump 22 and the second electric pump 23 are simultaneously started, an excessive amount of current is consumed by the hydraulic power steering system 1. This may affect the operation of other electrical equipment.

In order to avoid such a situation, the first ECU 43 and the second ECU 46 make a timing to start electric power supply to the first electric pump 22 and a timing to start electric power supply to the second electric pump 23 different from each other when the ignition switch (IG) is turned on or when the vehicle restarts after no-idling stop. That is, the timing to start the first electric pump 22 and the timing to start the second electric pump 23 are staggered.

Specifically, when the first current value Im1 has been within a prescribed current range continuously for a prescribed period of time or longer, the first microcomputer 71 in the present embodiment determines that start-up of the first motor 41 is completed and sets a start-up completion flag F indicating that start-up of the first motor 41 is completed (places the start-up completion flag F in an on-state). Then, the second microcomputer 73 receives the information on the state of the start-up completion flag F through the CAN 61. When the second microcomputer 73 determines that start-up of the first motor 41 is completed on the basis of the start-up completion flag F, the second microcomputer 73 starts power supply to the second motor 44. When the first current value Im1 has been less than a lower limit I_lo of the prescribed current range continuously for the prescribed period of time or longer, the first microcomputer 71 determines that the first motor 41 is stopped and clears the start-up completion flag F (places the start-up completion flag F in an off-state). An upper limit I_hi of the prescribed current range in the present embodiment is set to a value (for example, approximately 60 A) that is less than the limit value I_lim, and the lower limit I_lo of the prescribed current range is set to the minimum value (for example, approximately 5 A) of a current indicating that the first motor 41 is in the energized state. The prescribed period of time is set to a period of time (for example, approximately 100 msec) that is longer than a period of time during which the current instantaneously increases at the time of start-up, and is derived in advance, for example, by experiment.

Figure 3:
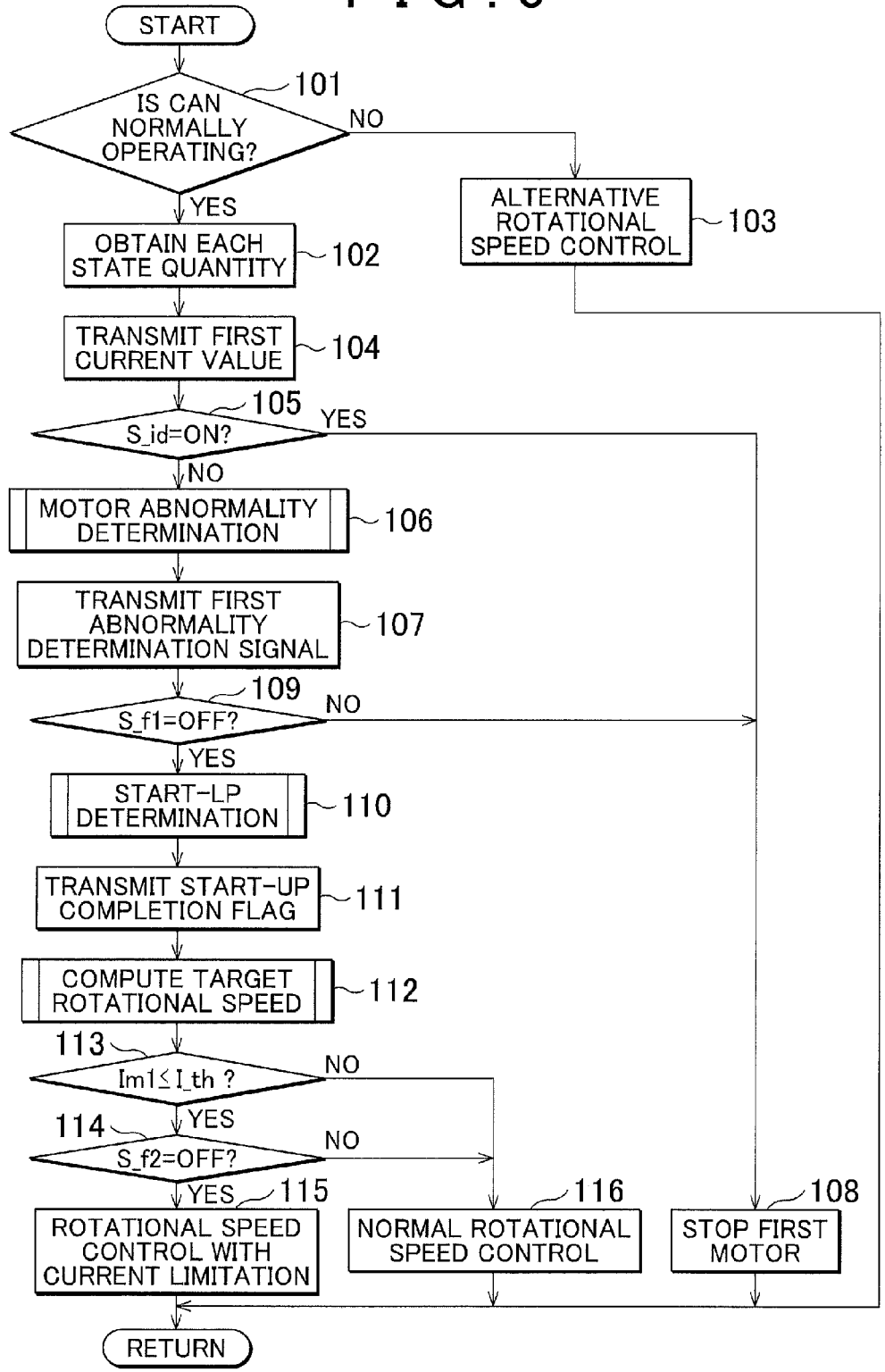
FIG. 3 is a flowchart illustrating the procedure for controlling a first electric pump.

Next, the procedure for controlling the first electric pump 22 by the first microcomputer 71 will be described. As illustrated in FIG. 3, when it is possible to receive the state quantities from the CAN 61 after the IG is turned on (YES in Step 101), the first microcomputer 71 receives the steering angle θs (the steering velocity ωs), the vehicle speed SPD, the second abnormality determination signal S_f2, and the stop-start signal S_id from the CAN 61 (Step 102). On the other hand, when it is not possible to receive the state quantities from the CAN 61 (NO in Step 101), the first microcomputer 71 executes the alternative rotational speed control (Step 103).

The first microcomputer 71 transmits the first current value Im1 received from the first current sensor 76, to the CAN 61 (Step 104), and determines whether or not the stop-start signal S_id is in an on-state, that is, whether or not the vehicle is in the no-idling stop state (Step 105). When the stop-start signal S_id is in an off-state, that is, the vehicle is not in the no-idling stop state (NO in Step 105), the first microcomputer 71 executes an abnormality determination on the first motor 41 (Step 106) and transmits the first abnormality determination signal S_f1 indicating the result of the abnormality determination on the first motor, to the CAN 61 (Step 107). When the stop-start signal S_id is in the on-state, that is, the vehicle is in the no-idling stop state (YES in Step 105), the first microcomputer 71 stops the first motor 41 by stopping the supply of the driving electric power to the first motor 41 (Step 108).

When the first abnormality determination signal S_f1 is in an off-state, that is, the first motor 41 is operating normally (YES in Step 109), the first microcomputer 71 executes a start-up determination on the first motor 41 (Step 110) and transmits the information on the state of the start-up completion flag F to the CAN 61 (Step 111). When the first abnormality determination signal S_f1 is in an on-state, that is, the first motor 41 has an abnormality (NO in Step 109), the first microcomputer 71 proceeds on to Step 108 to stop the first motor 41.

The first microcomputer 71 computes the target rotational speed based on the steering velocity ωs and the vehicle speed SPD (Step 112) and determines whether or not the first current value Im1 is less than or equal to the allowable current value I_th (Step 113). When the first current value Im1 is less than or equal to the allowable current value I_th (YES in Step 113), the first microcomputer 71 determines whether or not the second motor 44 is operating normally on the basis of the second abnormality determination signal S_f2 (Step 114). When the second abnormality determination signal S_f2 is in an off-state, that is, the second motor 44 is operating normally (YES in Step 114), the first microcomputer 71 executes the rotational speed control with current limitation (Step 115).

On the other hand, when the first current value Im1 is greater than the allowable current value I_th (NO in Step 113) or when the second abnormality determination signal S_f2 is in an on-state, that is, the second motor 44 has an abnormality (NO in Step 114), the first microcomputer 71 executes the normal rotational speed control (Step 116).

Figure 4:
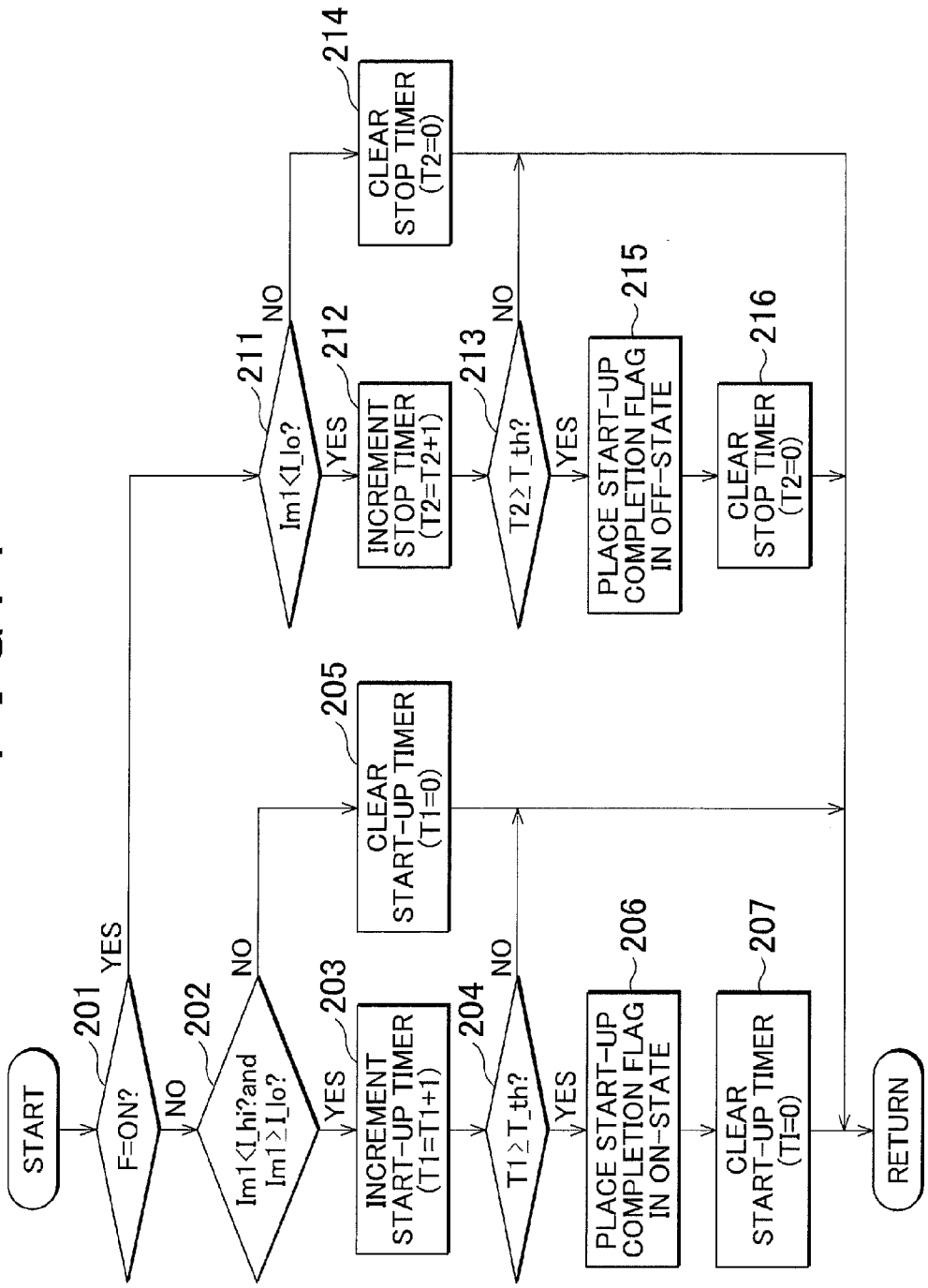
FIG. 4 is a flowchart illustrating the procedure for processing a start-up determination in a first embodiment of the invention.

Next, the procedure for processing a start-up determination on the first electric pump 22 by the first microcomputer 71 will be described. As illustrated in FIG. 4, the first microcomputer 71 determines whether or not the start-up completion flag F is in the on-state (Step 201). When the start-up completion flag F is not in the on-state (NO in Step 201), the microcomputer 71 determines whether or not the first current value Im1 is less than the upper limit I_hi and greater than or equal to the lower limit I_lo (Step 202). When the first current value Im1 is less than the upper limit I_hi and greater than or equal to the lower limit I_lo (YES in Step 202), that is, when the first current value Im1 is a value within the prescribed current range, a timer value T1 of a start-up timer provided in the first microcomputer 71 is incremented (Step 203), and whether or not the timer value T1 is greater than or equal to a determination value T_th indicating the prescribed period of time is determined (Step 204). On the other hand, when the first current value Im1 is greater than or equal to the upper limit I_hi or the first current value Im1 is less than the lower limit I_lo (NO in Step 202), that is, when the first current value Im1 is not a value within the prescribed current range, the timer value T1 of the start-up timer is cleared (Step 205).

When the timer value T1 of the start-up timer is greater than or equal to the determination value T_th (YES in Step 204), the first microcomputer 71 sets the start-up completion flag F (places the start-up completion flag F in the on-state) (Step 206) and clears the timer value T1 of the start-up timer (Step 207). On the other hand, when the timer value T1 of the start-up timer is less than the determination value T_th (NO in Step 204), the processes in Steps 206, 207 are not executed.

On the other hand, when the start-up completion flag F is in the on-state (YES in Step 201), the first microcomputer 71 determines whether or not the first current value Im1 is less than the lower limit I_lo (Step 211). When the first current value Im1 is less than the lower limit I_lo (YES in Step 211), a timer value T2 of a stop timer provided in the first microcomputer 71 is incremented (Step 212), and whether or not the timer value T2 is greater than or equal to the determination value T_th is determined (Step 213). On the other hand, when the first current value Im1 is greater than or equal to the lower limit I_lo (NO in Step 211), the timer value T2 of the stop timer is cleared (Step 214).

When the timer value T2 of the stop timer is greater than or equal to the determination value T_th (YES in Step 213), the first microcomputer 71 clears the start-up completion flag F (places the start-up completion flag F in the off-state) (Step 215) and clears the timer value T2 of the stop timer (Step 216). On the other hand, when the timer value T2 of the stop timer is less than the determination value T_th (NO in Step 213), the processes in Steps 215, 216 are not executed.

Figure 5:
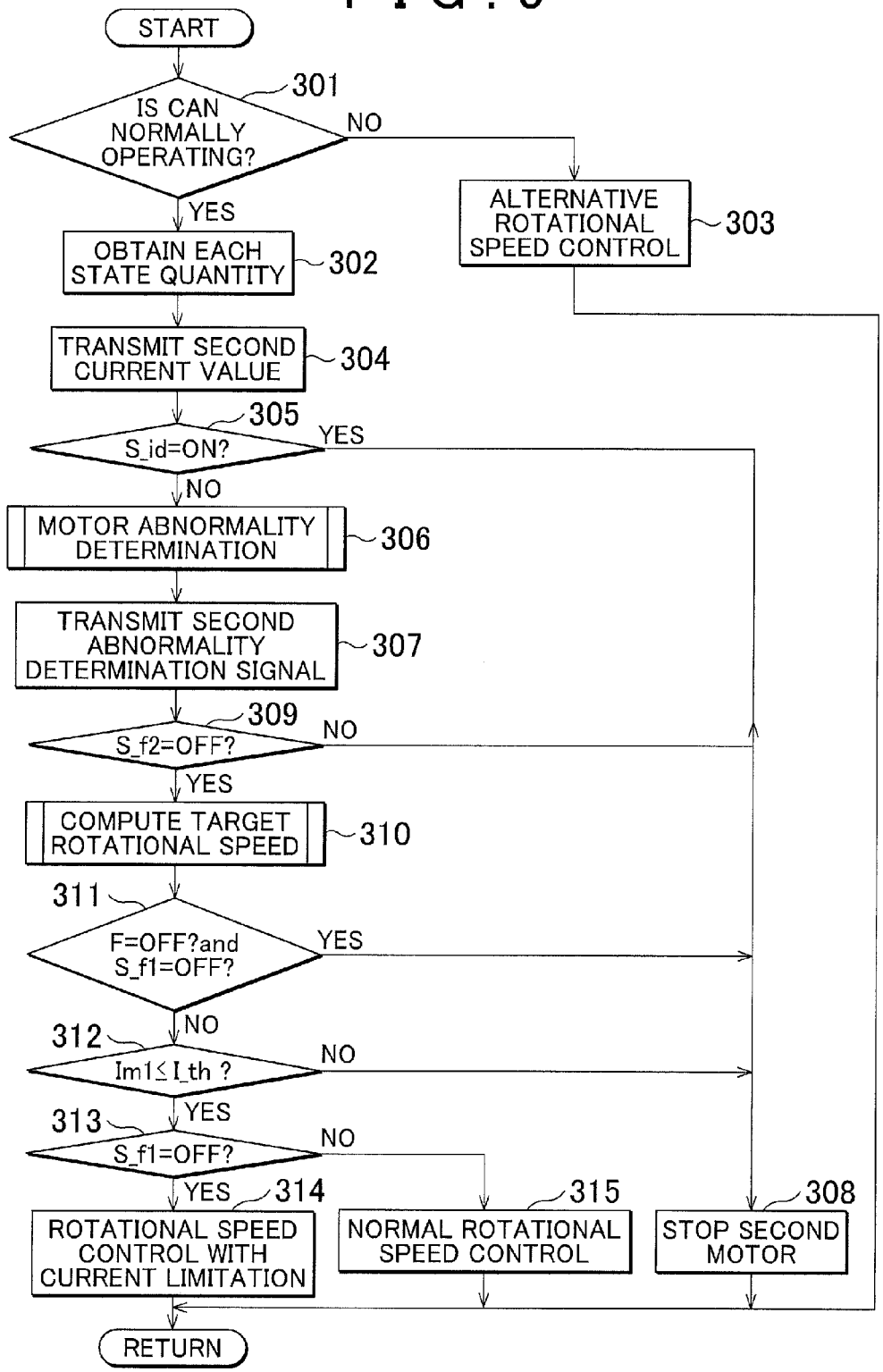
FIG. 5 is a flowchart illustrating the procedure for controlling a second electric pump.

Next, the procedure for controlling the second electric pump 23 by the second microcomputer 73 will be described. As illustrated in FIG. 5, when it is possible to receive the state quantities from the CAN 61 after the IG is turned on (YES in Step 301), the second microcomputer 73 receives the steering angle θs (the steering velocity ωs), the vehicle speed SPD, the first abnormality determination signal S_f1, and the stop-start signal S_id from the CAN 61 (Step 302). On the other hand, when it is not possible to receive the state quantities from the CAN 61 (NO in Step 301), the second microcomputer 73 executes the alternative rotational speed control (Step 303).

The second microcomputer 73 transmits the second current value Im2 received the second current sensor 78, to the CAN 61 (Step 304), and determines whether or not the stop-start signal S_id is in the on-state (Step 305). When the stop-start signal S_id is in the off-state, that is, the vehicle is not in the no-idling stop state (NO in Step 305), the second microcomputer 73 executes an abnormality determination on the second motor 44 (Step 306) and transmits the second abnormality determination signal S_f2 indicating the result of the abnormality determination on the second motor, to the CAN 61 (Step 307). When the stop-start signal S_id is in the on-state, that is, the vehicle is in the no-idling stop state (YES in Step 305), the second microcomputer 73 stops the second motor 44 by stopping the supply of the driving electric power to the second motor 44 (Step 308).

When the second abnormality determination signal S_f2 is in an off-state, that is, the second motor 44 is operating normally (YES in Step 309), the second microcomputer 73 computes the target rotation speed based on the steering speed ωs and the vehicle speed SPD (Step 310). On the other hand, when the second motor 44 has an abnormality (NO in Step 309), the second microcomputer 73 proceeds on to Step 308 to stop the second motor 44.

The second microcomputer 73 determines whether or not the start-up completion flag F is in the off-state and the first abnormality determination signal S_f1 is in the off-state, that is, whether or not start-up of the first motor 41 is uncompleted and the first motor 41 is operating normally (Step 311). When the start-up completion flag F is in the off-state and the first abnormality determination signal S_f1 is in the off-state (YES in Step 311), the second microcomputer 73 proceeds on to Step 308 to stop the second motor 44.

On the other hand, when the start-up completion flag F is in the on-state or the first abnormality determination signal S_f1 is in the on-state (NO in Step 311), the second microcomputer 73 determines whether or not the first current value Im1 received through the CAN 61 is less than or equal to the allowable current value I_th (Step 312). When the first current value Im1 is less than or equal to the allowable current value I_th (YES in Step 312), the second microcomputer 73 determines whether or not the first abnormality determination signal S_f1 is in the off-state (Step 313). When the first abnormality determination signal S_f1 is in the off-state and the first motor 41 is operating normally (YES in Step 313), the second microcomputer 73 executes the rotational speed control with current limitation (Step 314). On the other hand, when the first current value Im1 is larger than the allowable current value I_th (NO in Step 312), the second microcomputer 73 proceeds on to Step 308 to stop the second motor 44. When the first abnormality determination signal S_f1 is in the on-state and the first motor 41 has an abnormality (NO in Step 313), the second microcomputer 73 executes the normal rotational speed control (Step 315).

Next, the operation of the present embodiment will be described. When the first electric pump 22 and the second electric pump 23 are started from a standstill, for example, when the ignition switch (IG) is turned on or when the vehicle restarts after no-idling stop, first, the supply of the driving electric power from the first ECU 43 to the first motor 41 is started. Then, as indicated by a continuous line in a portion A in FIG. 6, the first current value Im1 rapidly increases from time t1 at which the supply of the driving electric power is started, and exceeds the upper limit I_hi. In this case, the first current value Im1 becomes a value within the prescribed current range before the first current value Im1 exceeds the upper limit I_hi. However, because the time period during which the first current value Im1 is continuously within the prescribed current range is shorter than the prescribed period of time, a determination that start-up of the first motor 41 is completed is not made. Therefore, as illustrated in a portion B in FIG. 6, the state of the start-up completion flag F does not change. Then, when the first motor 41 starts rotating, the first current value Im1 becomes a value within the prescribed current range. Then, at time t2 at which the state where the first current value Im1 is within the prescribed current range has continued for the prescribed period of time, a determination that start-up of the first motor 41 is completed is made and the start-up completion flag F is set (placed in the on-state). When the start-up completion flag F is placed in the on-state, the supply of the driving electric power from the second ECU 46 to the second motor 44 is started. The second current value Im2 becomes a value within the prescribed current range after instantaneously becoming a large value at the time of start-up, as indicated by a broken line in the portion A in FIG. 6.

For example, when the vehicle is brought to a temporary stop and enters the no-idling stop state, the supply of the driving electric power to the first motor 41 and the second motor 44 is stopped and the first current value Im1 becomes less than the lower limit I_lo. Then, at time t3 at which the state where the first current value Im1 is less than the lower limit I_lo has continued for a prescribed period of time, the start-up completion flag F is cleared (placed in the off-state).

Figure 6:
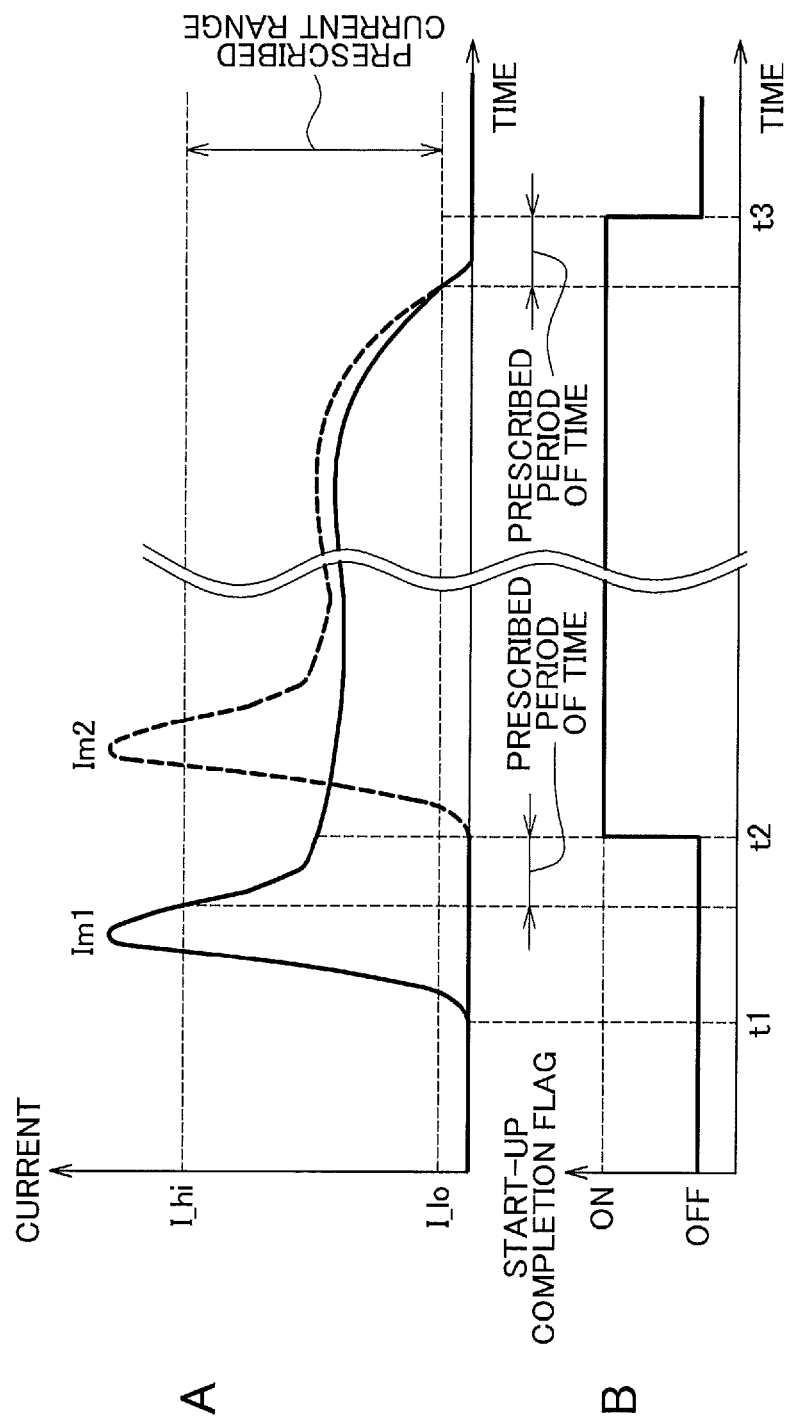
FIG. 6 illustrates graphs, wherein a portion A being a graph indicating changes in a first current value and a second current value from start-up to stop of the first and second electric pumps, and a portion B being a graph indicating a change in a start-up completion flag from start-up to stop of the first and second electric pumps.

The timing to start the first electric pump 22 and the timing to start the second electric pump 23 are staggered as described above, a large current does not flow simultaneously to the first electric pump 22 and the second electric pump 23, as illustrated in the portion A in FIG. 6. That is, a period of time during a large amount of current is consumed by the first electric pump 22 and a period of time during which a large amount of current is consumed by the second electric pump 23 do not overlap with each other. Therefore, even if two electric pumps, that is, the first electric pump 22 and the second electric pump 23, are provided as the hydraulic power sources for the hydraulic cylinder 21, the amount of current consumed at the time of, for example, turning on the ignition switch (IG) is prevented from being excessive.

Next, the advantageous effects of the present embodiment will be described. Because the timing to start the first electric pump 22 and the timing to start the second electric pump 23 are staggered, a large current does not flow simultaneously to the first electric pump 22 and the second electric pump 23. Thus, even if a plurality of electric pumps is provided as the hydraulic power sources for the hydraulic cylinder 21, the amount of current consumed at the time of, for example, turning on the ignition switch (IG) is prevented from being excessive.

As described above, a large current flows to each of the first electric pump 22 and the second electric pump 23 not continuously but instantaneously at the time of start-up. Therefore, when the first current value Im1 has been within the prescribed current range continuously for the prescribed period of time or longer, a determination that start-up of the first motor 41 is completed is made and the electric power supply to the second electric pump 23 is started. In this way, it is possible to reliably prevent a large current from flowing simultaneously to the first electric pump 22 and the second electric pump 23.

When electric power supply to the second electric pump 23 is started, the driving electric power is supplied simultaneously to the first electric pump 22 and the second electric pump 23. If the peak value of a current at the time of start-up is set to a low value, the responsiveness deteriorates. Therefore, a current at the time of start-up may become a considerably large value. Therefore, the upper limit I_hi of the prescribed current range is set to a value less than the limit value I_lim that is set as the maximum value of current that is supplied simultaneously to the first electric pump 22 and the second electric pump 23 after completion of start-up. In this way, it is possible to reliably prevent the current that is consumed, for example, at the time of turning on the ignition switch (IG) from being excessive.

Next, a control apparatus for the hydraulic power steering system 1 according to a second embodiment of the invention will be described with reference to the accompanying drawings. The main difference between the present embodiment and the first embodiment is only in a start determination on the first motor. Therefore, for convenience of description, the same configurations as those in the first embodiment will be denoted by the same reference symbols as those in the first embodiment, and the description thereof will be omitted.

The first microcomputer 71 in the present embodiment determines that start-up of the first motor 41 is completed when the rotational speed of the first electric pump 22 exhibits a decreasing tendency. Specifically, the first microcomputer 71 uses the first rotational speed $\omega 1$ as the rotational speed of the first electric pump 22, and sets the start-up completion flag F (places the start-up completion flag F in the on-state) when the first rotational speed $\omega 1$ becomes less than an immediately preceding value $\omega 1\_b$.

Figure 7:
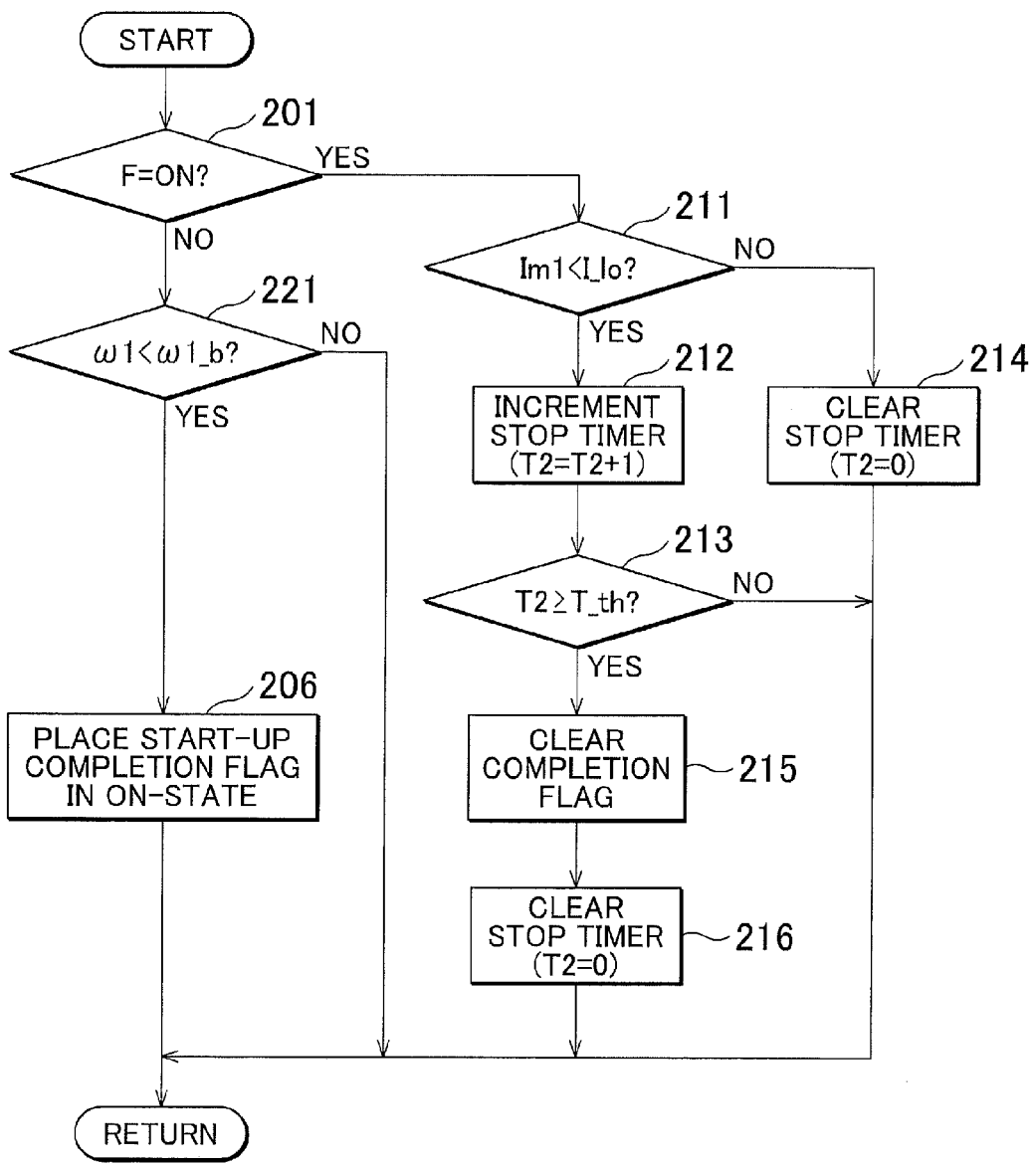
FIG. 7 is a flowchart illustrating the procedure for processing a start-up determination in a second embodiment of the invention.

As illustrated in FIG. 7, when the start-up completion flag F is not in the on-state (NO in Step 201), the first microcomputer 71 determines whether or not the first rotational speed $\omega 1$ is less than the immediately preceding value $\omega 1\_b$ thereof (Step 221). When the first rotational speed $\omega 1$ is less than the immediately preceding value $\omega 1\_b$ (YES in Step 221), the first microcomputer 71 proceeds on to Step 206 to set the start-up completion flag F. On the other hand, when the first rotational speed $\omega 1$ is greater than or equal to the immediately preceding value $\omega 1\_b$ (NO in Step 221), the first microcomputer 71 does not execute the process in Step 206. When the start-up completion flag F is in the on-state (YES in Step 201), the same process as that in the first embodiment described above is executed.

As described above, according to the present embodiment, the following advantageous effects are obtained. Usually, a current that flows at the time of start-up monotonically increases without decreasing until the current reaches the peak value thereof. Therefore, after the first current value Im1 and the second current value Im2 decrease once, start-up is assumed to be completed (refer to FIG. 6). The rotational speed of the first electric pump 22 and the rotational speed of the second electric pump 23 usually monotonically increase without decreasing at the time of start-up. Therefore, after the rotational speeds decrease once, start-up thereof is assumed to be completed. Therefore, when the first rotational speed $\omega 1$ exhibits a decreasing tendency, the supply of the driving electric power to the second electric pump 23 is started. As a result, it is possible to promptly start the two electric pumps, that is, the first electric pump 22 and the second electric pump 23, while preventing the amount of current consumed at the time of, for example, turning on the ignition switch (IG) from being excessive.

Note that, the above-described embodiments may be modified as described below. In the first embodiment described above, the upper limit I_hi of the prescribed current range is set to a value less than the limit value I_lim. However, the invention is not limited to this, and the upper limit I_hi may be changed as needed as long as the upper limit I_hi is a value less than or equal to the maximum value of a current based on the capacity of the in-vehicle power supply 75, which can be stably supplied simultaneously to the first electric pump 22 and the second electric pump 23 after completion of start-up. Similarly, the limit value I_lim may be changed as needed as long as the limit value I_lim is less than or equal to the maximum value. Further, the lower limit I_lo may be changed as needed as long as the lower limit I_lo is a value greater than the minimum value indicating that the motor is in the energized state.

In the second embodiment described above, when the rotational speed of the first electric pump 22 exhibits a decreasing tendency, a determination that start-up of the first motor 41 is completed is made. However, the invention is not limited to this. For example, when the first current value Im1 exhibits a decreasing tendency, a determination that start-up of the first motor 41 is completed may be made. In this case, in Step 221 in FIG. 7, whether or not the first current value Im1 is less than the immediately preceding value thereof is determined. When both the rotational speed of the first electric pump 22 and the first current value Im1 exhibit a decreasing tendency, a determination that start-up of the first motor 41 is completed may be made.

In each embodiment described above, when the first current value Im1 has been less than the lower limit I_lo of the prescribed current range continuously for the prescribed period of time or longer, the start-up completion flag F is cleared. However, the invention is not limited to this. For example, when the vehicle is placed in the non-idling stop state, the start-up completion flag F may be cleared.

In each embodiment described above, two electric pumps, that is, the first electric pump 22 and the second electric pump 23, are provided as the hydraulic power sources for the hydraulic cylinder 21. However, three or more electric pumps may be provided. In each embodiment described above, the first electric pump 22 and the second electric pump 23 have the first ECU 43 and the second ECU 46, respectively. However, the invention is not limited to this. The operation of the first motor 41 and the operation of the second motor 44 may be controlled by a single ECU.

What is claimed is:

1. A control apparatus for a hydraulic power steering system, the hydraulic power steering system including two or more electric pumps that supply hydraulic fluid to a hydraulic actuator that generates assist force, wherein when starting the two or more electric pumps, the control apparatus for the hydraulic power steering system staggers timings to start electric power supplies to motors serving as driving sources of the respective electric pumps, and wherein when a value of current passed to a first electric pump, which is one of the two or more electric pumps and to which electric power is started to be supplied, has been within a prescribed current range continuously for a prescribed period of time or longer, the control apparatus for the hydraulic power steering system starts electric power supply to a second electric pump that is one of the two or more electric pumps and that has been at a standstill.

2. The control apparatus for the hydraulic power steering system according to claim 1, wherein:

an upper limit of the prescribed current range is set to be less than or equal to a limit value provided as an upper limit of a current that is supplied simultaneously to the two or more electric pumps after completion of start-up; and a lower limit of the prescribed current range is set to be greater than or equal to a minimum value of a current indicating that the first electric pump is in an energized state.

* * * * *